United States Patent [19]
Starek et al.

[11] Patent Number: 6,070,174
[45] Date of Patent: May 30, 2000

[54] METHOD AND APPARATUS FOR REAL-TIME SECURE FILE DELETION

[75] Inventors: Robert Phillip Starek; George Friedman; David Earl Marshall; Jason Lee Chambers; Michael J. Moorman; Terry S. Newgard, all of Austin, Tex.

[73] Assignee: Infraworks Corporation, Austin, Tex.

[21] Appl. No.: 09/114,756

[22] Filed: Jul. 13, 1998

Related U.S. Application Data

[63] Continuation-in-part of application No. 08/940,746, Sep. 30, 1997, Pat. No. 5,991,778.

[51] Int. Cl.$^7$ .................................................... G06F 17/30
[52] U.S. Cl. ........................... 707/206; 707/205; 707/200
[58] Field of Search .................................... 707/205, 206, 707/200, 10; 49/87.1; 395/7.2

[56] References Cited

U.S. PATENT DOCUMENTS

| | | | |
|---|---|---|---|
| 4,996,663 | 2/1991 | Nemes | 707/200 |
| 5,265,159 | 11/1993 | Kung | 380/4 |
| 5,485,613 | 1/1996 | Engelstad et al. | 707/206 |
| 5,689,701 | 11/1997 | Ault et al. | 707/10 |
| 5,742,818 | 4/1998 | Shoroff et al. | 707/200 |
| 5,761,680 | 6/1998 | Cohen et al. | 707/206 |
| 5,765,192 | 6/1998 | Berliner | 711/136 |
| 5,808,821 | 9/1998 | Davy | 360/48 |
| 5,819,298 | 10/1998 | Wong et al. | 707/205 |
| 5,832,526 | 11/1998 | Schuyler | 707/205 |
| 5,881,229 | 3/1999 | Singh et al. | 709/203 |
| 5,909,540 | 6/1999 | Carter et al. | 395/182.02 |
| 5,991,778 | 11/1999 | Starek et al. | 707/205 |

OTHER PUBLICATIONS

Workplace: The Messy Business of Culling Computer Files, Alex Markels, *The Wall Street Journal*, May 22, 1997.

Examining the Windows 95 Layered File Systems, by Mark Russinovich and Bryce Cogswell, *Dr. Dobb's Journal*, Dec. 1995.

The Windows 95 File Systems, 1996 *Knowles Consulting*.

Disk Partitioning Under FAT File System Saves Disk Space and Aids in Organization, Sidney D. Peters, *Peters Computer Services*.

Inside the Windows 95 File System, Stan Mitchell, *O'Reilly & Associates, Inc.*, pp. 124–143; 202–203.

Matlock et al., Microsoft Windows NT step by step, Microsoft Press, pp. 92–94, Jan. 1994.

NTFS obtained via the internet, <http://fuhs.ropnorth.org/network/hardware/boot/NTFS.html>, Jun. 1999.

SNOOP–PROOF YOUR PC obtained from the Internet <www.infowar.comp/p_and_s/p_and_s 022498c> printed Dec. 30, 1998, two pages.

*Primary Examiner*—Anton W. Fetting
*Assistant Examiner*—Greta L. Robinson
*Attorney, Agent, or Firm*—Stroock & Stroock & Lavan LLP

[57] ABSTRACT

A method and apparatus are provided that enhance file system calls to a file system structure of an operating system. In particular, file system calls can be enhanced to provide real-time secure file deletion on an ongoing basis. A file system call that is intended to perform a function with respect to data stored on a storage device is intercepted. It is then determined whether the file system call is of a type that should be processed. If not, the original file system call is passed on through the file system. If the file system call should be processed, supplemental processing is performed to enhance the original file system call and the file system call is transparently returned to the calling system application. In embodiment, real-time secure file deletion is implemented using a vendor supplied driver (VSD) executing within the installable file system (IFS) of WINDOWS 95. Further, a method and system are disclosed for real-time secure data deletion in a system having an NTFS file system. Read calls are monitored using a read filter and pointers to NTFS metafiles and page files are recognized and stored. Write calls are monitored using a write filter and real-time secure data deletion of buffers is performed. File creation operations are monitored and real-time secure data deletion of user files is performed when the file is to be overwritten. Further, set information operations are monitored and real-time secure data deletion is performed for truncated, shrunk or deleted user files.

2 Claims, 9 Drawing Sheets

METHOD AND APPARATUS FOR REAL-TIME SECURE FILE DELETION

CROSS-REFERENCE TO RELATED APPLICATIONS

This application is a continuation-in-part of U.S. patent application Ser. No. 08/940,746, filed Sep. 30, 1997, by Robert P. Starek, et al., and entitled "Method and Apparatus for Real-Time Secure File Deletion," now U.S. Pat. No. 5,991,778.

TECHNICAL FIELD OF THE INVENTION

The present invention relates in general to the field of electronic systems, and more specifically to a method and apparatus for real-time secure file deletion.

BACKGROUND OF THE INVENTION

File management processes executed by operating systems and system applications typically do not implement secure file deletion. For example, in WINDOWS 95, deletion of a file does not make the contents of the file unrecoverable. In fact, it can be a relatively simple process to recover the deleted file. Further, many common software applications such as word processing, e-mail and spreadsheet applications write temporary files during operation. Although these applications typically automatically delete the temporary files, they do so using an insecure file deletion method leaving traces of the files on the hard drive or other storage device. Virtual memory files, such as swap files, also cause a problem in that file fragments are swapped in and out the virtual memory files during operation. The fact that information is thus available on a storage device despite having apparently been deleted generates a security risk that is unacceptable to many individuals and public and private organizations.

One method for alleviating this problem is simply to physically destroy the storage device such that any data stored thereon is unrecoverable. However, this is an understandably expensive and time consuming solution. As an alternative to physical destruction of the storage device, conventional secure file deletion products provide targeted secure file deletion functions. Examples of conventional products include NUKER (available from GENIO USA), MICROZAP (available from NEW TECHNOLOGIES INC.), BURNIT (available from SYNCRONYS SOFTCORP) and SECUREWIN (available from CIPHER LOGICS CORPORATION).

In general, "secure" deletion involves overwriting the appropriate space on the storage device with specified overwrite arrays to obscure the original data. The overwrite arrays can be random or pseudo-random data as well as defined character or data patterns. Further, a series of overwrites can be performed in sequence with different specified arrays to ensure that the data can not be recovered even by destructive analysis of the fixed storage media. Conventional targeted secure deletion products allow a user to select a file for deletion and then securely delete that file. Such products can also allow a user to secure delete all free media space on a storage device. Also, conventional secure delete products may allow a user to secure delete virtual memory files (e.g., swap files).

However, conventional secure file deletion products suffer from a number of problems. One problem is that the targeted nature of the conventional products relies upon user activation of the process. Further, the user only executes the secure deletion process at discrete points in time. Thus, during the period of time between successive executions, the storage device will contain insecurely deleted information. Further, conventional products can be prohibitively time consuming because, to secure a storage device, they have to process the entire device to overwrite all unused storage space.

SUMMARY OF THE INVENTION

In accordance with the present invention, a method and apparatus for real-time secure file deletion are disclosed that provide advantages over previously developed secure file deletion methods and products.

According to one aspect of the present invention, a method and apparatus provide enhancement of file system calls to a file system structure of an operating system. In particular, the file system calls can be enhanced to provide real-time secure file deletion on an ongoing basis. According to the present invention, a file system call that is intended to perform a function with respect to data stored on a storage device is intercepted. It is then determined whether the file system call is of a type that should be processed. If not, the original file system call is passed on through the file system. If the file system call should be processed, supplemental processing is performed to enhance the original file system call and the file system call is transparently returned to the calling system application. In one embodiment, real-time secure file deletion is implemented using a vendor supplied driver (VSD) executing within the installable file system (IFS) of WINDOWS 95.

According to another aspect of the present invention, a method and system are disclosed for real-time secure data deletion in a system having an NTFS file system. Read calls are monitored using a read filter and pointers to NTFS metafiles and page files are recognized and stored. Write calls are monitored using a write filter and real-time secure data deletion of buffers is performed. File creation operations are monitored and real-time secure data deletion of user files is performed when the file is to be overwritten. Further, set information operations are monitored and real-time secure data deletion is performed for truncated, shrunk or deleted user files.

A technical advantage of the present invention is the interception of file system calls such that supplemental file management processes can be performed in a manner transparent not only to the user but also to the operating system.

Another technical advantage of the present invention is that secure file deletion is performed real-time on an ongoing basis transparently to the user of the system. Thus, secure deletion of files on storage devices is accomplished without relying upon periodic actions by the user.

A further technical advantage of the present invention is that, for write calls, overhang of data in the existing file on the storage device is identified and overwritten as part of the real-time secure deletion process.

Another technical advantage is that secure deletion of buffers, user files and other data in a WINDOWS NT file system are automatically handled.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
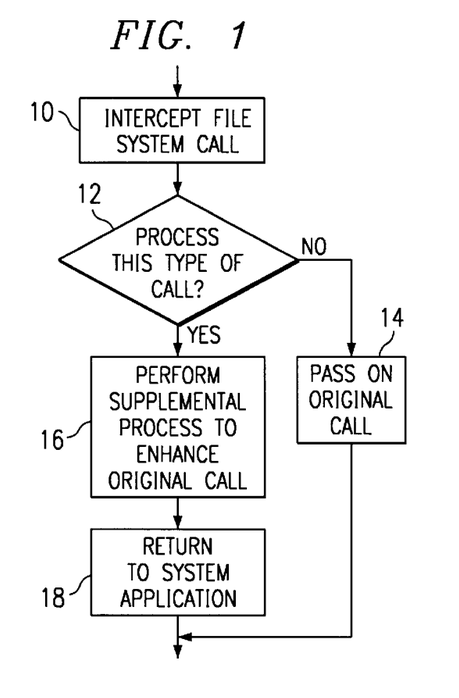
FIG. 1 is a flow chart of one embodiment of a method for enhancing file system calls to a file system structure of an operating system according to the present invention.

FIG. 1 is a flow chart of one embodiment of a method for enhancing file system calls to a file system structure of an operating system according to the present invention. The method of FIG. 1 can be implemented, for example, by a software driver executing within the file system established by the operating system of a personal computer, computer workstation or other computing device. For example, the method of FIG. 1 can be implemented using a vendor supplied driver (VSD) executing within the installable file system (IFS) of WINDOWS 95.

As shown in FIG. 1, in step 10, a file system call is intercepted. In general, the file system call is intended to perform some function with respect to data stored on a storage device but is intercepted before being able to complete that function. The storage device can be a hard disk drive, a ZIP drive, floppy drive, tape drive, writeable CD ROM drive or other fixed or removable storage media. The file system call can be, for example, a file system delete, write, open, rename, close, read or other file system call. In step 12 of FIG. 1, it is determined whether the type of call intercepted is one that should be processed. If not, then in step 14, the original call is passed on through the file system. If the call should be processed, then in step 16, supplemental processing is performed to enhance the original call. In particular, in step 16, the original call can be enhanced to ensure real-time secure file deletion on the storage device. One implementation of supplemental processing to ensure secure file deletion is provided by FIGS. 4–8. According to the present invention, the supplemental processing of step 16 can be accomplished transparently both to the user and to the calling system application. After the supplemental processing, the call is returned, in step 18, to the calling system application.

Figure 2:
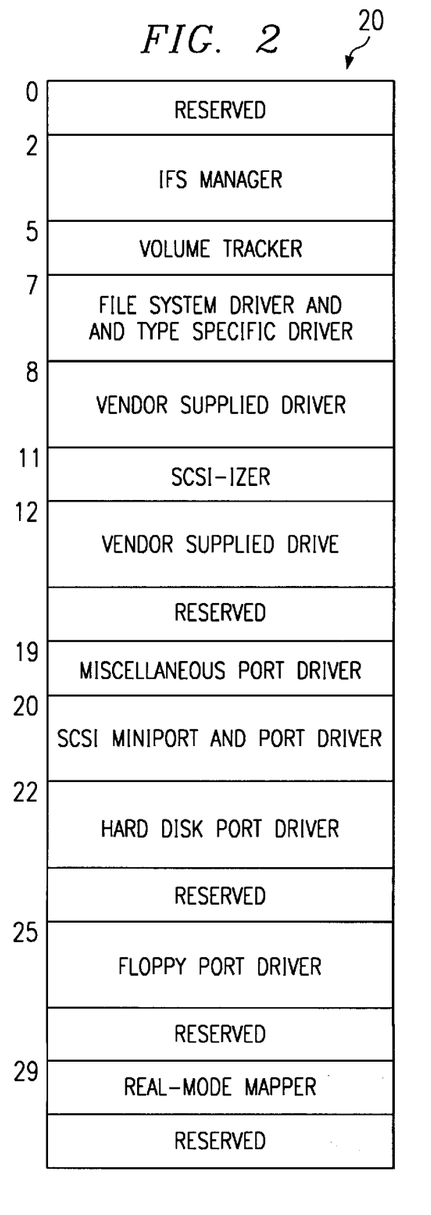
FIG. 2 is a diagram of the file system logical layers of the WINDOWS 95 operating system.

FIG. 2 is a diagram of file system logical layers of the WINDOWS 95 installable file system (IFS). The installable file system is described, for example, in "Examining the Windows 95 Layered File System: Adding Functionality to Block Devices," Mark Russinovich and Bryce Cogswell, 1997 [http://www.ddj.com/ddj/1995/ 1995.12/russinov.htm as of Sep. 4, 1997]. As shown in FIG. 2, the installable file system is made up of thirty two logical layers, each containing one or more virtual devices through which block-device requests pass. For typical hardware, most of the logical layers are empty. For example, for hard disk drives, a file system request (or call) will usually only pass through about five virtual devices on the way to the hardware.

Figure 3:
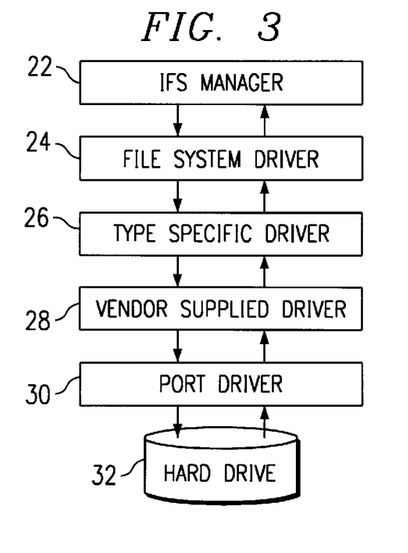
FIG. 3 is a diagram of a typical file system request chain within the file system logical layers of the WINDOWS 95 operating system.

FIG. 3 is a diagram of a typical file system request chain or path within the file system logical layers of the WINDOWS 95 operating system. As shown in FIG. 3, a typical path begins at the IFS manager 22 and moves to the file system driver 24. The request then moves to a type specific driver 26 and a vendor supplied driver 28. After vendor supplied driver 28, the request falls to a port driver 30 and to the hard drive 32 (or other storage device). After the request is completed at the physical level, the request returns up the chain to the calling system application.

In FIG. 2, the numbers on the lefthand side represent the layers of abstraction with the smallest numbers representing higher layers of abstraction. The topmost layer is the entry point to the file system. Higher numbers are closer to the hardware, and the highest number (bottom layer) represents the virtual devices that access the hardware directly. An input/output (I/O) supervisor (IOS) manages requests as they pass through the file-system hierarchy. Each virtual device on the chain can select requests based on the logical or physical drive to which the request is directed. The devices can also view the result of a request as it passes back up the chain to the application. Furthermore, the virtual device drivers (VxDs) on the chain can service requests themselves and not pass them to lower levels, or they can generate requests themselves.

Processes can occur at each level of the installable file system, but most block devices do not require an entry at each level in the chain. At the top of the logical layer structure, the IFS manager layer manages high-level I/O requests from applications. It takes a call directed at a specific logical drive and passes it down the correct call-down chain to the appropriate volume tracker, file system driver (FSD), and so on. Volume trackers work with groups of devices with identical removability rules. For example, a CD-ROM volume tracker ensures that a CD with a file system on it is in the drive before it will allow any requests to pass through to lower layers. File system drivers (FSDs) work with all devices of a particular type, such as hard disks or CD-ROM devices. They take incoming logical requests generated by the IFS manager and translate them into physical requests to pass to lower levels. In addition, FSDs can initiate logical error recovery for devices such as disks.

Type specific drivers (TSDs) work with all devices of a particular type. They take a logical request generated by an FSD and translate it into a physical sector request. They generally reside in the same layer as their corresponding FSDs, but are lower in the chain. SCSI-izers are next in the chain and are used because SCSI devices require more-complex request packets than other devices such as the more-prevalent IDE/ESDI devices. SCSI-izers take a general physical request and create a SCSI Request Block (SRB) that contains detailed, SCSI-specific information about the request such as the Logical Unit Number (LUN) and Target (SCSI targets can have up to seven LUNs hanging off them).

Vendor supplied drivers (VSDs) provide a special layer for third-party developers under WINDOWS 95. Consequently, the VSD layer functionality is determined by the VSD writer. Conventional uses include: block-device monitors, low-level secondary disk caches (caching in flash memory, for example), data encryption, and RAID disk management.

SCSI port drivers take incoming requests and determine which SCSI miniport driver should field them. Multiple SCSI types can be loaded onto the same system, each of which may require a custom SCSI miniport driver. The SCSI port driver is also in charge of initializing the miniport drivers. SCSI miniport drivers (MPDs) are the hardware drivers for SCSI devices. They manage the interrupt and I/O port-level interaction with the device to carry out requests from above. They can also perform adapter-specific error recovery.

Port drivers (PDRs) (for non-SCSI hardware) carry out analogous functions as the SCSI port and miniport drivers. They provide 32-bit disk access interacting directly with the hardware to perform I/O. The real mode mapper (RMM) is used in certain situations where WINDOWS 95 can not provide a port drive. With the introduction of plug-and-play BIOS, and by including many hardware-specific port drivers, WINDOWS 95 can usually provide 32-bit access for most disk hardware. However, Windows 95 might be run on an older personal computer with esoteric hardware, so it must make allowances for the case where it can not provide a port driver to handle disk I/O in protected mode. A system might also use real-mode disk-driver software that provides functionality not available in the WINDOWS 95 protected-mode counterpart. For these situations, the last entry on the chain of protected-mode virtual device drivers is an RMM instead of a port driver. RMMs call down to a real-mode driver to perform hardware I/O and return results up the file-system chain. Real-mode drivers are hardware drivers required by the hardware or software configuration of a particular system. However, use of real-mode drivers is discouraged because performance can suffer (due to the overhead of transitions from protected to real mode and slower execution in real mode), but makes allowances for them for flexibility and backward compatibility.

In general, the upper layers of the file system structure are written by MICROSOFT as part of WINDOWS 95, while the lower layers are provided by disk-drive manufacturers. Consequently, the layer typically used for development by third-party developers is the virtual device driver (VSD) layer. As mentioned above, according to the present invention, a VSD can be used to intercept file system calls and perform supplemental processing. In particular, the files system calls can be enhanced to ensure real-time secure file deletion.

In one implementation of the present invention, a vendor supplied driver is used to intercept file system delete, write, open(create always) and rename calls and to provide the real-time secure file deletion functionality. Interception of the these calls occurs in step 10 of FIG. 1. The above calls are ten identified, in step 12, as ones for which supplemental processing will be performed. Supplemental processing then occurs within step 16 of FIG. 1.

Figure 4:
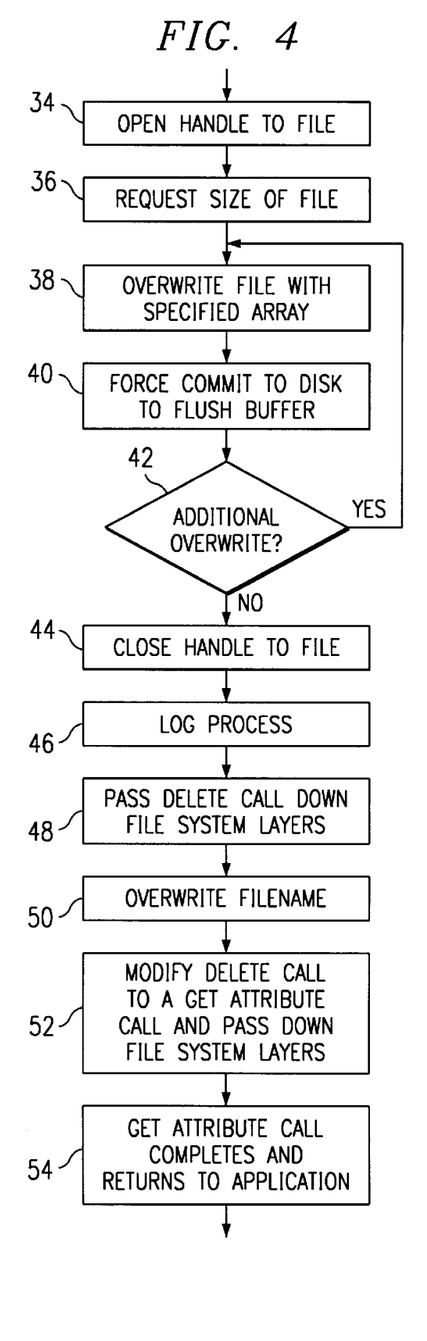
FIG. 4 is a flow chart of one embodiment of supplemental processing after interception of a delete call according to the present invention.

FIG. 4 is a flow chart of one embodiment of supplemental processing after interception of a delete call according to the present invention. In step 34, the driver opens a handle to the file identified in the delete call, and in step 36, the driver requests the size of the file. Then in step 38, the driver overwrites the file with a specified overwrite array. The specified array can be any desired pattern of characters or data and can be user defined or default to a pre-defined pattern. In step 40, the driver generates a force commit to disk to flush the write buffer of the storage device and ensure that the overwrite array is actually written to the media. In step 42, the driver checks whether additional overwrites should be performed. If so, the driver returns to step 38. Each overwrite iteration can use a different overwrite array to attain increasing levels of security. For example, the overwrite arrays can cause each storage location to alternatively be written to a "0" and a "1" to obscure the original data stored at that location. In some implementations, there are seven overwrite iterations to ensure that the original data is securely deleted even if analyzed using destructive testing and advanced detection equipment.

After the overwrite process is complete, the driver closes the handle to the file in step 44. In step 46, the driver logs the process just completed to an in-memory log. The in-memory log can be periodically written to the storage device as a log file. In step 48, the driver passes the original delete call down the file system layers such that the proper flags are set for the system to consider the delete to have properly completed. In step 50, the driver then overwrites the filename of the file just deleted. One embodiment of overwriting the filename is shown in and described with respect to FIG. 8. After overwriting the filename, in step 52, the driver modifies the original delete call to make it a get file attribute call and passes the new call down the file system layers. In step 54, the get file attribute call completes and returns to the calling system application.

Figure 5:
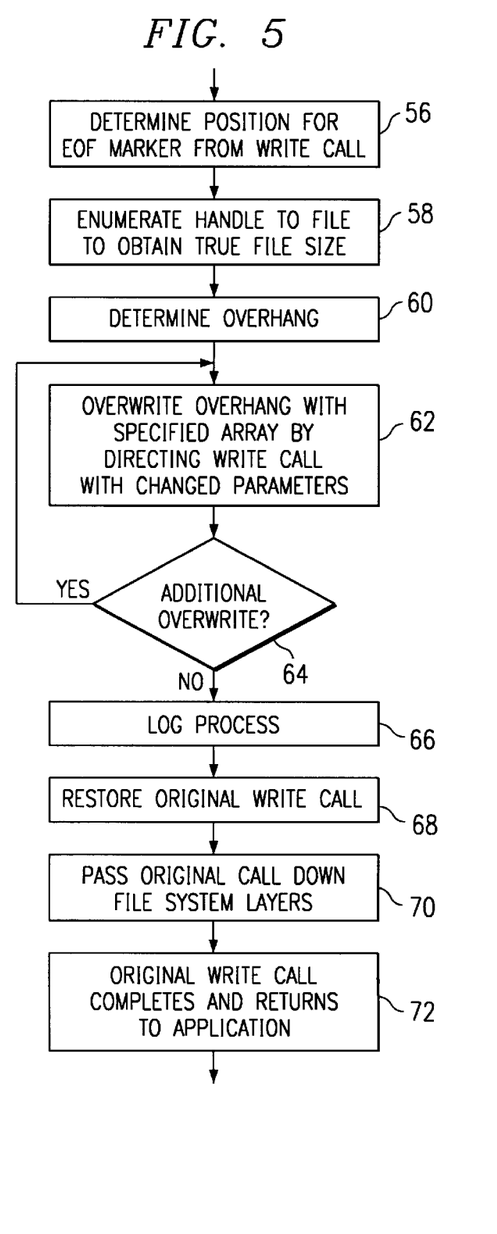
FIG. 5 is a flow chart of one embodiment of supplemental processing after interception of a write call according to the present invention.

FIG. 5 is a flow chart of one embodiment of supplemental processing after interception of a write call according to the present invention. For the write call, the call is intercepted and captured by the driver only if the write has a length of zero. This indicates that the write call is placing the end-of-file (EOF) marker after the contents of the file have already been written to the storage device. After interception of a write call with length zero, in step 56, the driver determines the position for the end-of-file (EOF) marker directly from the write call. In step 58, the driver obtains the true file size of the file using an enumerate handle function. Then, in step 60, the driver determines the overhang, if any, of the file based upon the true file size and the position of the new EOF marker. The overhang is the portion of the file that existed prior to the write that would extend past the new EOF marker.

In step 62, the driver overwrites the overhang with a specified overwrite array. As was described above, the overwrite array can be user-defined or pre-defined and is designed to obscure the original data stored in the storage device. In step 62, the driver performs the overwrite by directing the original intercepted write call to the file system with changed parameters such that the overhang is over-written. Then, in step 64, the driver determines whether additional overwrites should be performed. If so, the application returns to step 62. Successive iterations of overwrites can use different overwrite arrays to better ensure secure deletion as described above. After overwriting the overhang, the driver logs the process in the in-memory log which can be periodically written to the storage device. Then, in step 70, the driver passes the original write call down the file system layers to place the EOF marker as originally intended. In step 72, this write call completes and returns to the calling system application.

Figure 6:
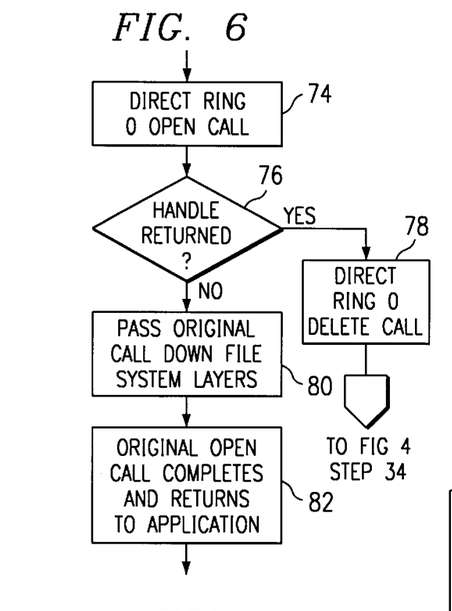
FIG. 6 is a flow chart of one embodiment of supplemental processing after interception of an open(create always) call according to the present invention.

FIG. 6 is a flow chart of one embodiment of supplemental processing after interception of an open(create always) call according to the present invention. An open(create always) call is one that opens a file and, in doing so, always creates a new file rather than simply opening the existing file. This means that the old file still exists on the storage device and may not be overwritten by the newly created file. After interception of the open(create always) call, the driver directs a "ring zero" open call through the file system. A "ring zero" call is one that process down from the IFS manager through the entire file system logical layer structure. Thus, the ring zero open call will be passed back to the driver.

In step 76, the driver determines whether a handle for the file is returned. If a handle is returned, it indicates that the file exists, otherwise the file is a new file. If a handle is returned, then the handle is closed and, in step 78, the driver directs a ring zero delete call for the existing file. This delete call is passed back to the driver and intercepted as with other delete calls such that processing continues at step 34 of FIG. 4. If it is determined in step 76 that a handle was not returned, then the driver passes the original open(create always) call down the file system layers in step 80. In step 82, the original open call completes and returns to the system application.

Figure 7:
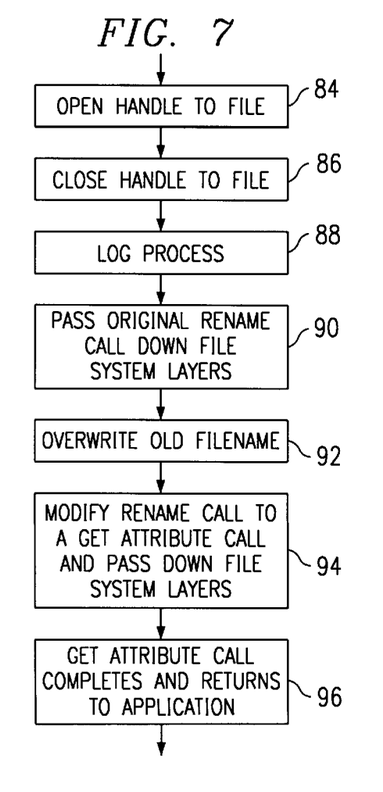
FIG. 7 is a flow chart of one embodiment of supplemental processing after interception of a rename call according to the present invention.

FIG. 7 is a flow chart of one embodiment of supplemental processing after interception of a rename call according to the present invention. In step 84, the driver opens a handle to the file. Opening a handle to the file provides information about the file which is returned in the file open block structure. This information is needed to perform the overwrite filename process of FIG. 8 and is described below. In step 86, the driver closes the handle to the file, and then, in step 88, logs the process to the in-memory log. The driver passes the original rename call down the file system layers in step 90. Then, in step 92, the driver overwrites the old filename, for example, according to the process of FIG. 8. In step 94, the driver modifies the original rename call to a get attribute call and passes the get attribute call down the file system layers. In step 96, the get attribute call completes and returns to the calling system application.

Figure 8:
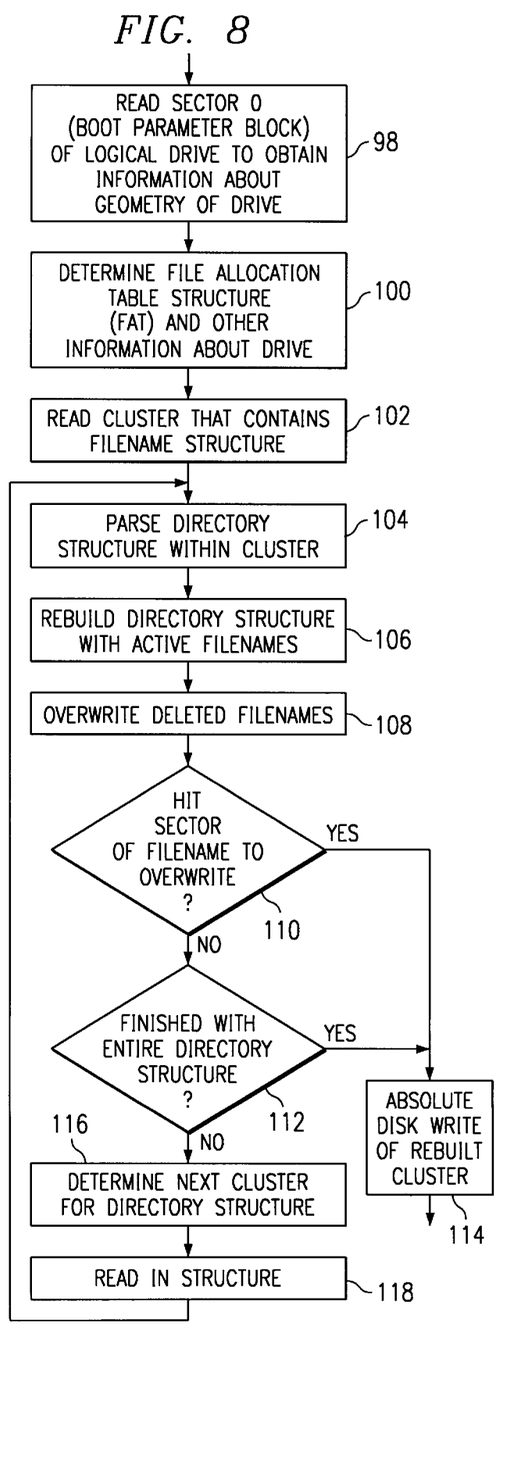
FIG. 8 is a flow chart of one embodiment of overwriting a filename according to the present invention.

FIG. 8 is a flow chart of one embodiment of overwriting a filename according to the present invention. The process of FIG. 8 ensures that deleted filenames are overwritten and organizes active filenames within the directory structure- Prior to starting the process of FIG. 8, the driver has information about the file based upon having opened a handle to the file. In particular, the file open block structure provides the starting sector for the directory entry of the filename and the starting cluster of the directory structure. The following table sets forth the position of this information within the file open block structure for WINDOWS 95 GOLD and OSR2 versions.

| OFFSET & LABEL GOLD 95 | | OFFSET & LABEL OSR2 | | COMMENT |
|---|---|---|---|---|
| 40 | DWORD d40 | 18 | DWORD d18 | starting sector for directory entry of filename |
| 50 | DWORD sector_pos | 1C | DWORD d20 | starting cluster of directory structure |

This starting sector and starting cluster information is used by the driver to locate and overwrite filenames.

In step 98 of FIG. 8, the driver reads sector zero (the boot parameter block) of the logical drive to obtain information about the geometry of the logical drive. Then, in step 100, the driver determines the file allocation table (FAT) structure and other information about the logical drive. In step 102, the driver reads the cluster that contains the directory structure containing the filename to be overwritten. The correct cluster can be determined using the starting cluster of directory structure obtained from the file open block structure as shown in the above table.

After the cluster has been read, in step 104, the driver parses the directory structure within the cluster to process each field within the directory structure. The directory structure contains sequentially positioned fields for filenames that each consume, for example, 32 bytes of storage. In step 106, if the driver encounters an active filename, the driver rebuilds the directory structure by adding the active filename. In step 108, if the driver encounters a deleted filename, the driver overwrites the deleted filename with a specified overwrite array. As described above, the overwrite array can be a user-defined or pre-defined pattern designed to obscure the original data. Further, the overwriting of step 108 can involve one or multiple overwrites to provide varying levels of secure deletion.

In step 110, the driver checks whether it has reached the specific sector or filename that initiated the overwrite. If so, the filename overwrite process continues at step 114. If not, in step 112, the driver checks whether it has finished the entire directory structure. If so, the process continues at step 114. If not, the driver determines the next cluster for the directory structure in step 116, and the driver reads in the structure in step 118. Then, the process returns to step 104 to continue parsing the directory structure. After the filename has been overwritten, in step 114, the driver forces an absolute disk write of the rebuilt cluster containing the active filenames to ensure that the data is actually written to the storage device.

According to the above implementation of the present invention, the file system delete, write, open(create always) and rename calls are intercepted and processed to provide secure file deletion. This secure file deletion is performed real-time on an ongoing basis transparently to the user of the system. Thus, secure file deletion is accomplished without relying upon periodic actions by the user.

Figure 9:
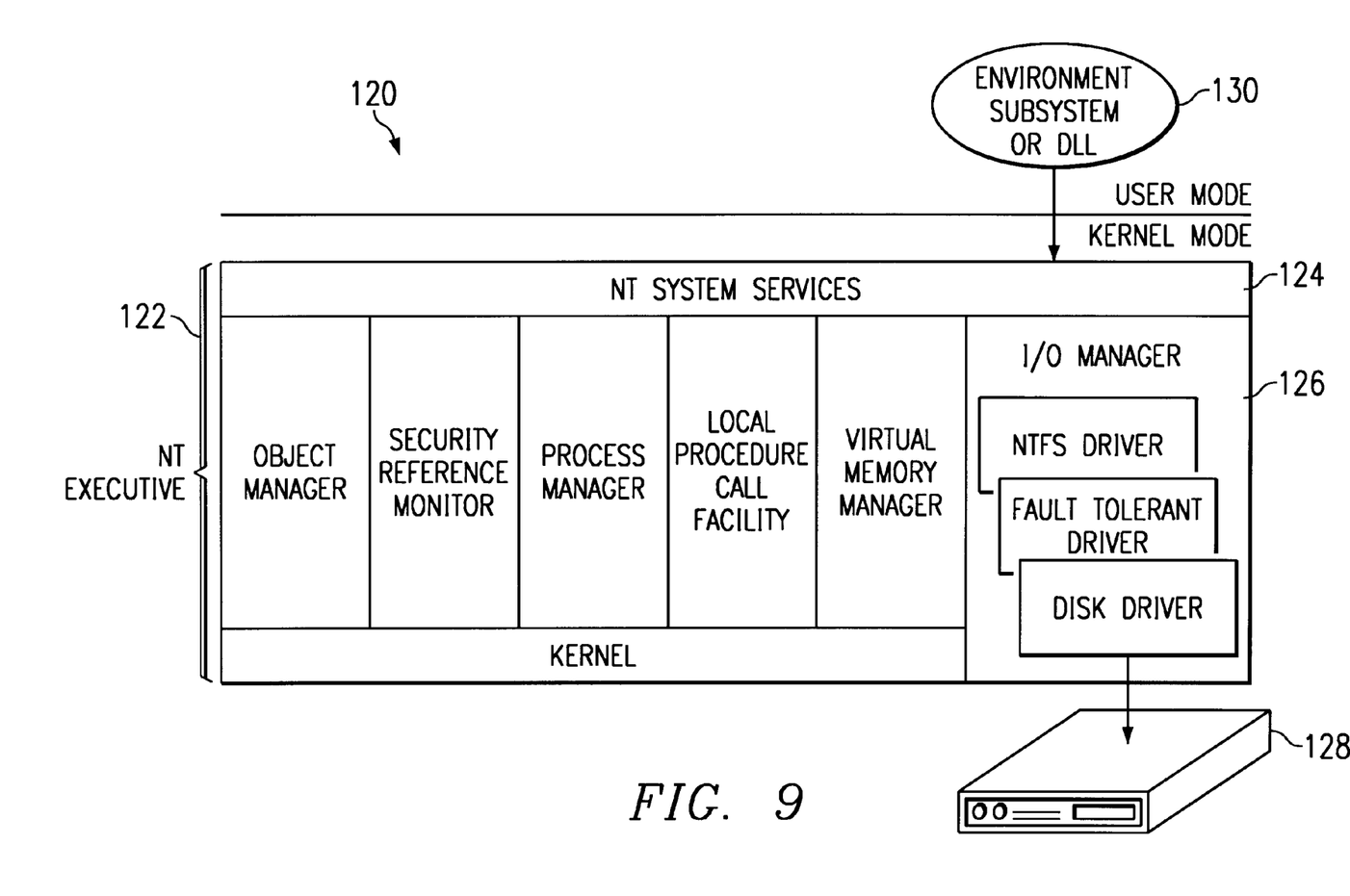
FIG. 9 is a block diagram of components of the WINDOWS NT I/O system.

FIG. 9 is a block diagram of components of the WINDOWS NT I/O system, indicated generally at 120. As shown, I/O system 120 includes a number of components referred to as the NT executive 122. Within NT executive 122, there is NT system services 124 and I/O manager 126 as well as other components. I/O manager 126 can interface with a storage device such as a disk drive 128. As shown, these components of I/O system 120 are part of the kernel mode of WINDOWS NT. In the user mode, there can be an environment subsystem or dynamic linked library (DLL) 130 that interfaces with NT system services 124.

In WINDOWS NT, the NT file system (NTFS) and other file systems are loadable drivers. They can be added to or removed from the operating system as they are needed. All drivers then work within the context of I/O system 120 and are invoked indirectly by applications that use Win32 or other I/O application program interfaces (APIs). As shown in FIG. 9, the environment subsystems 130 call NT system services 124, which in turn locate the appropriate loaded drivers and call them.

Figure 10:
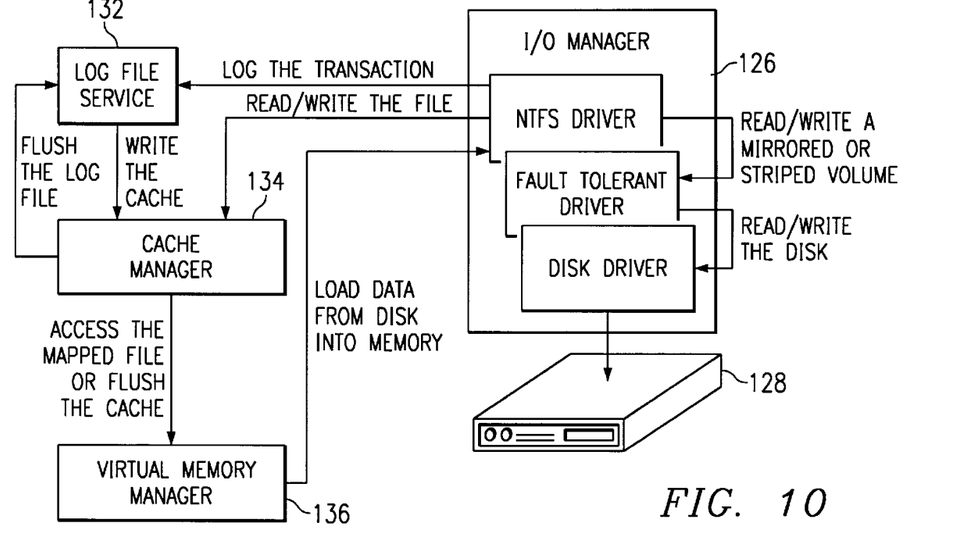
FIG. 10 is a block diagram of NTFS and related executive components.

FIG. 10 is a block diagram of NTFS and related executive components. As shown, the log file service (LFS) 132 is a module of NT executive 122 that provides services for maintaining a log of disk writes. The log file it writes is used to recover an NTFS-formatted volume in the case of a system failure. The cache manager 134 is a component of NT executive written 134 that provides system-wide caching services for NTFS and other file system drivers, including network file system drivers (servers and redirectors). All file systems implemented for WINDOWS NT access cached files by mapping them into virtual memory and reading and writing to virtual memory. Cache manager 134 provides a specialized file system interface to the WINDOWS NT virtual memory manager (VM manager) 136 for this purpose. When a program tries to access a part of a file that is not loaded into the cache (a cache miss), VM manager 136 calls NTFS to access the disk driver and obtain the file contents from disk. Cache manager 134 optimizes disk I/O by using its lazy writer, a set of system threads that calls VM manager 136 to flush cache contents to disk as a background activity (asynchronous disk writing).

The relationships shown for NTFS in FIG. 10 are generally the same as those for the other Windows NT-supported file systems: the FAT file system, HPFS, and network file systems. The only difference is that these file systems do not call the log file service to log transactions.

Figure 11:
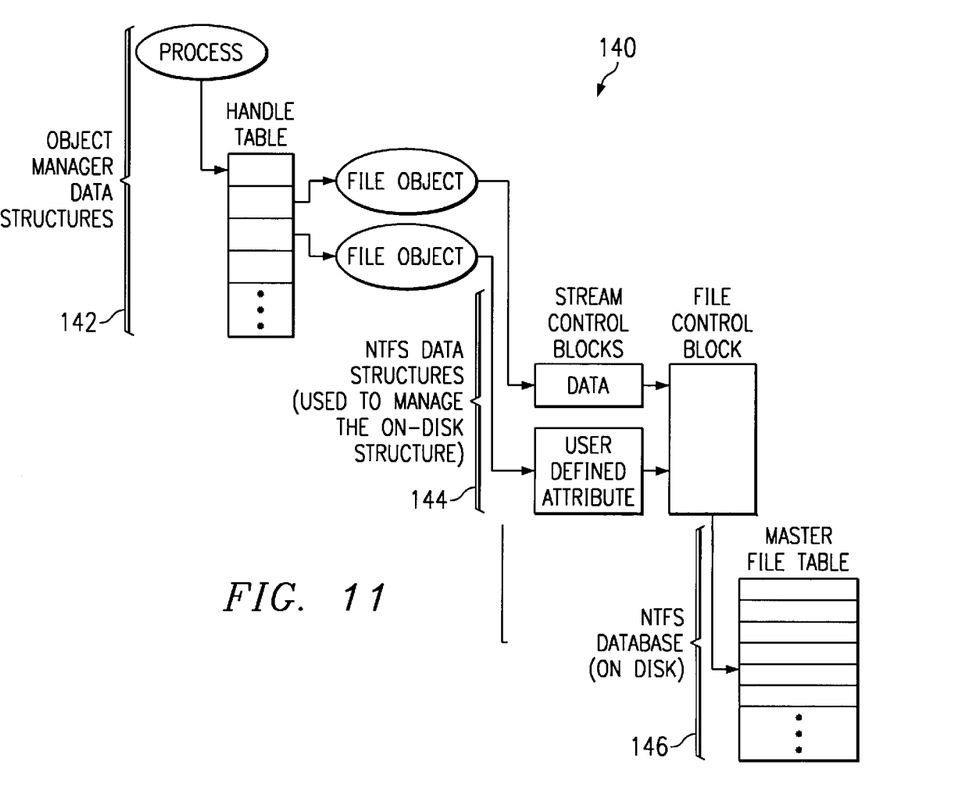
FIG. 11 is a block diagram of the NTFS object model.

FIG. 11 is a block diagram of the NTFS object model, indicated generally at 140. As shown, the object model 140 includes object manager data structures 142, NTFS data structures 144 and NTFS database 146. In generally, NTFS participates in the WINDOWS NT object model by implementing files as objects. This allows files to be shared and protected by the object manager. An application creates or accesses a file just as it does other NT objects: by means of object handles. By the time an I/O request reaches NTFS, the WINDOWS NT object manager and security system have already verified that the calling process has the authority to access the file object in the way it is attempting to. The I/O manager has also transformed the file handle into a pointer to a file object. NTFS uses the information in the file object to access the file on disk.

FIG. 11 illustrates the data structures that link the memory-based object architecture to the file system's on-disk structure. NTFS is called with a pointer to a file object. It follows several pointers to get from the file object to the location of the file on disk. As shown, a file object, which represents a single call to the open-file system service, points to a stream control block (SCB) for the file attribute that the caller is trying to read or write. In FIG. 11, a process has opened both the data attribute and a user-defined attribute for the file. The SCBs represent individual file attributes and contain information about how to find specific attributes within a file. All the SCBs for a file point to a common data structure called a file control block (FCB). The FCB contains a pointer (actually, a file reference) to the file's record in the disk-based master file table (MFT).

NTFS views a file as a collection of attributes, just as the Windows NT object manager views an object as a collection of attributes. NTFS uses the same read routine regardless of whether it is reading a file's data attribute, its security descriptor attribute, its file name attribute, or any of the file's other attributes. Similarly, when writing to a file, NTFS takes an attribute as a parameter and writes to that attribute. Because these object routines are generic, they are designed to easily accommodate new attributes that may be added in the future.

The structure of NTFS begins with a volume. A volume corresponds to a logical partition on a disk, and it is created when you format a disk or part of a disk for NTFS. A volume consists of a series of files plus any additional unallocated space remaining on the disk partition. In the FAT file system and HPFS, a volume also contains areas specialty formatted for use by the file system. An NTFS volume, however, stores all file system data, such as bitmaps and directories, and even the system bootstrap, as ordinary files. NTFS is like the FAT file system in that it uses the cluster as its fundamental unit of disk allocation.

The cluster size on a volume, or cluster factor, is established by the NTFS Format utility when a user formats the volume. Internally, NTFS refers only to clusters and is unaware of a disk's sector size. NTFS refers to physical locations on a disk by means of logical cluster numbers (LCNs). LCNs are simply the numbering of all clusters from the be ginning of the volume to the end. To convert an LCN to a physical disk address, NTFS multiplies the LCN by the cluster factor to get the physical byte offset on the volume, as the disk driver interface requires.

As mentioned above, NTFS maintains a file called the master file table (MFT), which is the heart of the NTFS volume structure. Logically, the MFT contains one row for each file on the volume, including a row for the MFT itself. In addition to the MFT, each NTFS volume contains a boot file and a set of files containing data called metadata or metafiles that is used to implement the file system structure. The rest of the files on an NTFS volume are normal user files and directories. The MFT is implemented as an array of file records. An MFT "row," representing one file on the disk, usually consists of one file record. However, if a file has a large number of attributes or becomes highly fragmented, more than one file record might be needed. In such a case, the first record, which stores the locations of the others, is called the base file record. A file on an NTFS volume is identified by a 64-bit value called a file reference. The file reference consists of a file number and a sequence number. The file number corresponds to the position of the file's file record in the MFT minus one (or to the position of the base file record minus one if the file has more than one file record). The file reference sequence number, which is incremented each time an MFT file record position is reused, enables NTFS to perform internal consistency checks.

Figure 12:
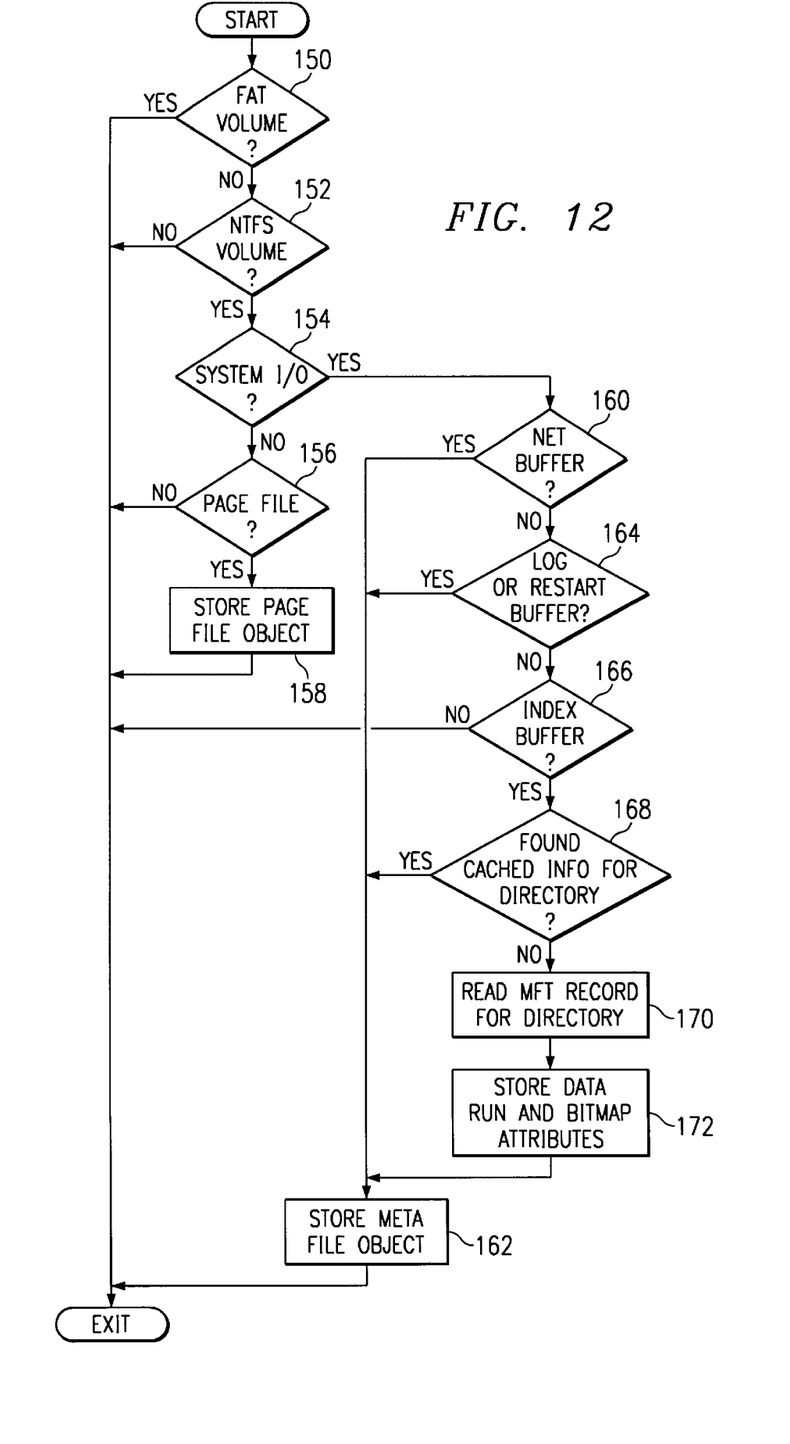
FIG. 12 is a flow chart of one embodiment of a process for an NTFS read filter for real-time secure data deletion under NTFS.

FIG. 12 is a flow chart of one embodiment of a process for an NTFS read filter for real-time secure data deletion under NTFS. This process provides a read filter for monitoring read calls in order to recognize and hold pointers to NTFS metadata and the page file. These files can be recognized by the absence of a file name and the content of the buffer. As shown in FIG. 12, in step 150, the process determines whether or not the disk volume is a FAT volume. If so, the process exits. If not, the process continues at step 152 and determines whether or not the volume is an NTFS volume. If not, the process exits. If the volume is an NTFS volume, the process continues at step 154. In step 154, the process determines whether or not the read call is through system I/O call. If not, in step 156 the process determines whether or not the call is to a page file. If not, the process exits. If so, the process stores the page file object in step 158 and exits.

Returning to step 154, if the call is through system I/O, the process continues at step 160 and determines whether the call involves the master file table (MFT) buffer. If so, the process stores the metafile object in step 162 and exits. If not, the process continues at step 164 and determines whether or not the call involves a log or restart buffer. If so, the process stores the metafile object in step 162 and exits. If not, the process determines, in step 166, whether the call involves an index buffer. If not, the process exits. If so, the process continues at step 168 and determines whether or not cached information is found for that directory. If so, the process stores the metafile object in step 162 and exits. If not, the process reads the master file table record for the directory in step 170, and then stores data run in bitmap attributes in step 172. After step 172, the process stores the metafile object in step 162 and exits.

Figure 13:
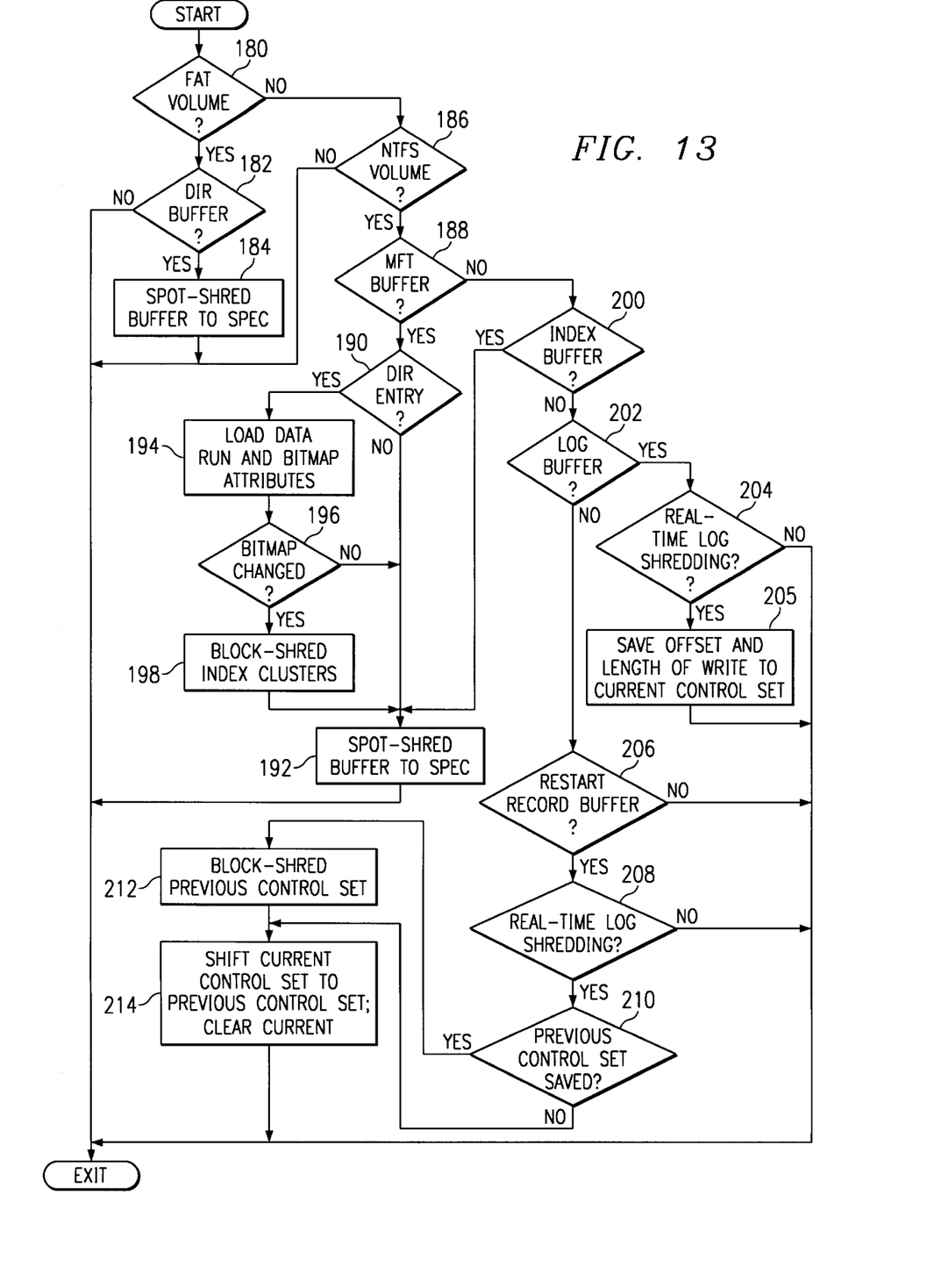
FIG. 13 is a flow chart of one embodiment of a process for NTFS read filter for real-time secure data deletion.

FIG. 13 is a flow chart of one embodiment of a process for NTFS read filter for real-time secure data deletion. This process provides a write filter on NTFS metadata and FAT index files. These files can be recognized by the absence of an associated file name and the content of the buffer. As shown in FIG. 13, in step 180, the process determines whether or not the volume is a FAT volume. If so, the process determines, in step 182, whether the buffer is a directory buffer. If not, the process exits. If so, the process spot shreds the buffer to specification in step 184. The term "shred" is used to mean that data is securely deleted in real-time such that the data is unrecoverable. Step 184 thus involves real-time secure deletion of the data, for example, by overwriting the data with specified patterns to make it unrecoverable in a manner analogous to that described above. Shredding to specification involves following a specified number of overwrites with specified overwrite patterns.

In step 180, if the volume is not a FAT volume, the process continues in step 186 and determines whether the volume is an NTFS volume. If not, the process exits. If the volume is an NTFS volume, the process continues at step 188 and determines whether the buffer is a master file table buffer. If so, the process determines, in step 190, whether there is a directory entry. If not, the process spot shreds the buffer to specification in step 192 and exits. If there is a directory entry, the process loads the data run and bitmap attributes in step 194. Then, in step 196, the process determines whether the bitmap is changed. If not, the process spot shreds the buffer to specification in step 192 and exits. If so, the process block shreds index clusters in step 198, and then returns to step 192 to spot shred the buffer to specification.

Returning to step 188, if the buffer is not an MFT buffer, the process determines in step 200 whether the buffer is an index buffer. Is so, the process spot shreds the buffer to specification in step 192 and exits. If not, the process determines whether or not the buffer is a log buffer in step 202. If so, in step 204, the process determines whether real-time log shredding has been selected. If not, the process exits. If so, the process saves the offset and length of write to the current control set in step 205 and exits.

Returning to step 202, if the buffer is not a log buffer, the process determines whether it is a restart record buffer in step 206. If not, the process exits. If so, the process determines, in step 208, whether or not real-time log shredding has been selected. If not, the process exits. If so, the process determines in step 210 whether a previous control set was saved. If so, the process block shreds the previous control set and moves to step 214. If not, the process moves directly to step 214. In step 214, the process shifts the current control set to the previous control set and clears the current control set. Following step 214, the process exits.

Figure 14A:
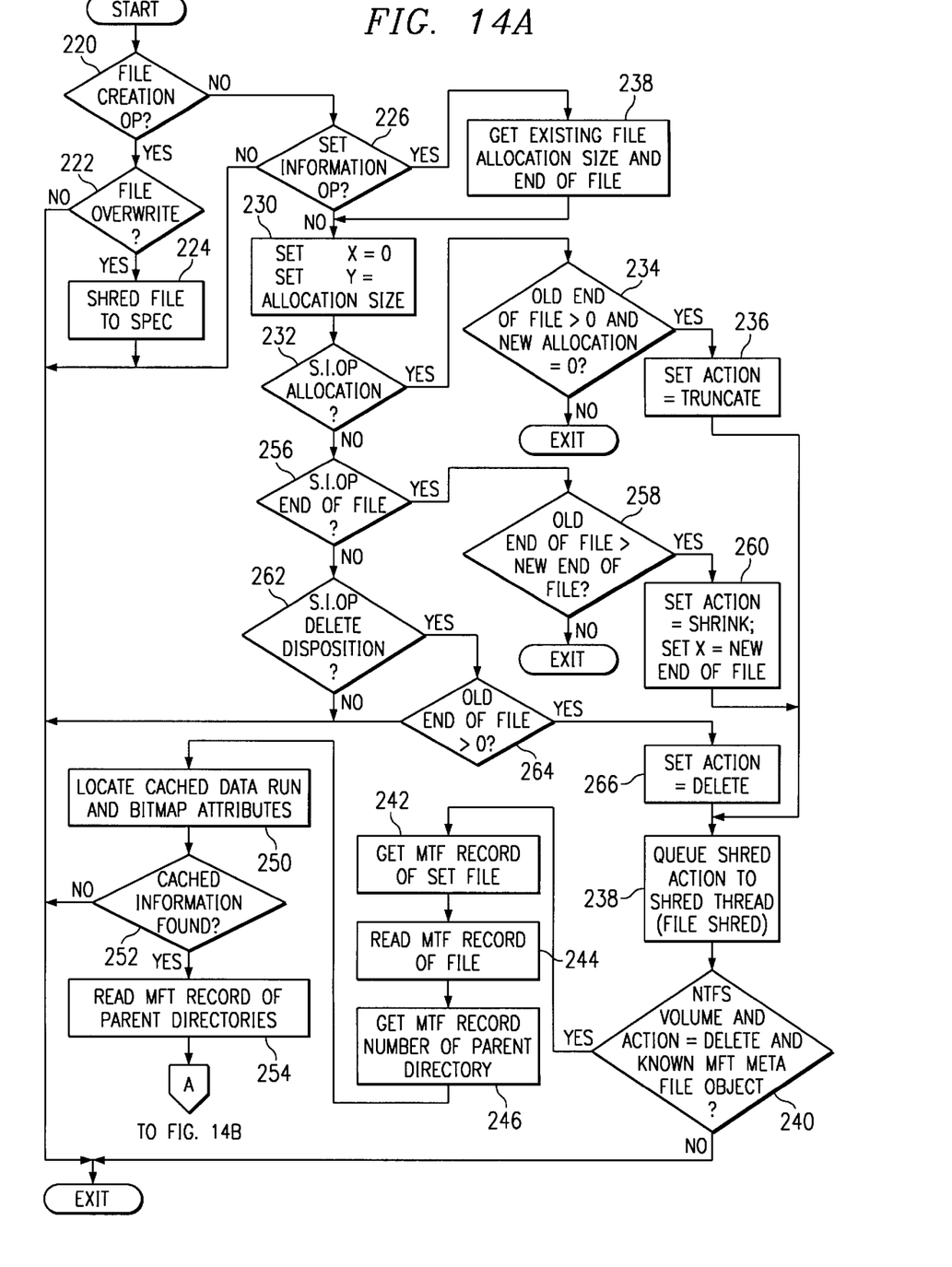
FIG. 14A is a flow chart of one embodiment of a process for real-time secure data deletion of NTFS user files.

FIG. 14A is a flow chart of one embodiment of a process for real-time secure data deletion of NTFS user files. The process of FIG. 14 is initiated in several ways. The first occurs when a user file is opened with overwrite intentions. The second occurs when a file is deleted, and the third occurs when end-of-file is set below the existing end-of-file. This process can handle both NTFS and FAT user file shredding.

As shown in FIG. 14A, the process determines whether an operation is a file creation operation in step 220. If so, in step 222, the process determines whether it is a file overwrite. If so, the process shreds the file to specification in step 224. If not, the process exits.

Returning to step 220, if the operation is not a file creation operation, the process determines, in step 226, whether it is a set information operation. If so, the process gets the existing file allocation size and end-of-file in step 228. Then in step 230, the process sets a variable "x" equal to zero, and a variable "y" equal to the allocation size. In step 232, the process determines whether the set information operation is for allocation. If so, in step 234, the process determines whether the old end-of-file is greater than zero and whether the new allocation is equal to zero. If not, the process exits. If so, the process sets a "shred action" equal to "truncate" in step 236. Then, in step 238, the process queues the shred action to a shred thread (file shred).

From the queue, in step 240, the process determines whether there is an NTFS volume, the shred action is equal to "delete," and there is a known MFT metafile object. If not, the process exits. If so, the process gets the MFT record number of the user file in step 242. Then in step 244, the process reads the MFT record of the file and, in step 246, the process gets the MFT record number of the parent directory. Following this, in step 250, the process locates the cached data run and bitmap attributes. In step 252, the process determines whether cached information was found. If not, the process exits. If so, the process reads the MFT record of the parent directory in step 254 and continues at step 270 of FIG. 14B (described below).

Returning to step 232, if the set information operation is not an allocation, the process determines, in step 256, whether the operation is an end-of-file operation. If so, the process determines, in step 258, whether the old end-of-file is greater than the new end-of-file. If not, the process exits. If so, the process sets the shred action equal to "shrink" and sets "x" equal to the new end-of-file. The process then queues the shred action to the shred thread in step 238, which proceeds at step 240 as described above.

If, in step 256, the operation is not an end-of-file operation, the process determines, in step 266, whether the operation is a delete disposition operation. If not, the process exits. If so, the process checks whether the old end-of-file is greater than zero in step 264. If so, the process sets the shred action to "delete" in step 266 and proceeds to step 238. If not, the process exits.

Figure 14B:
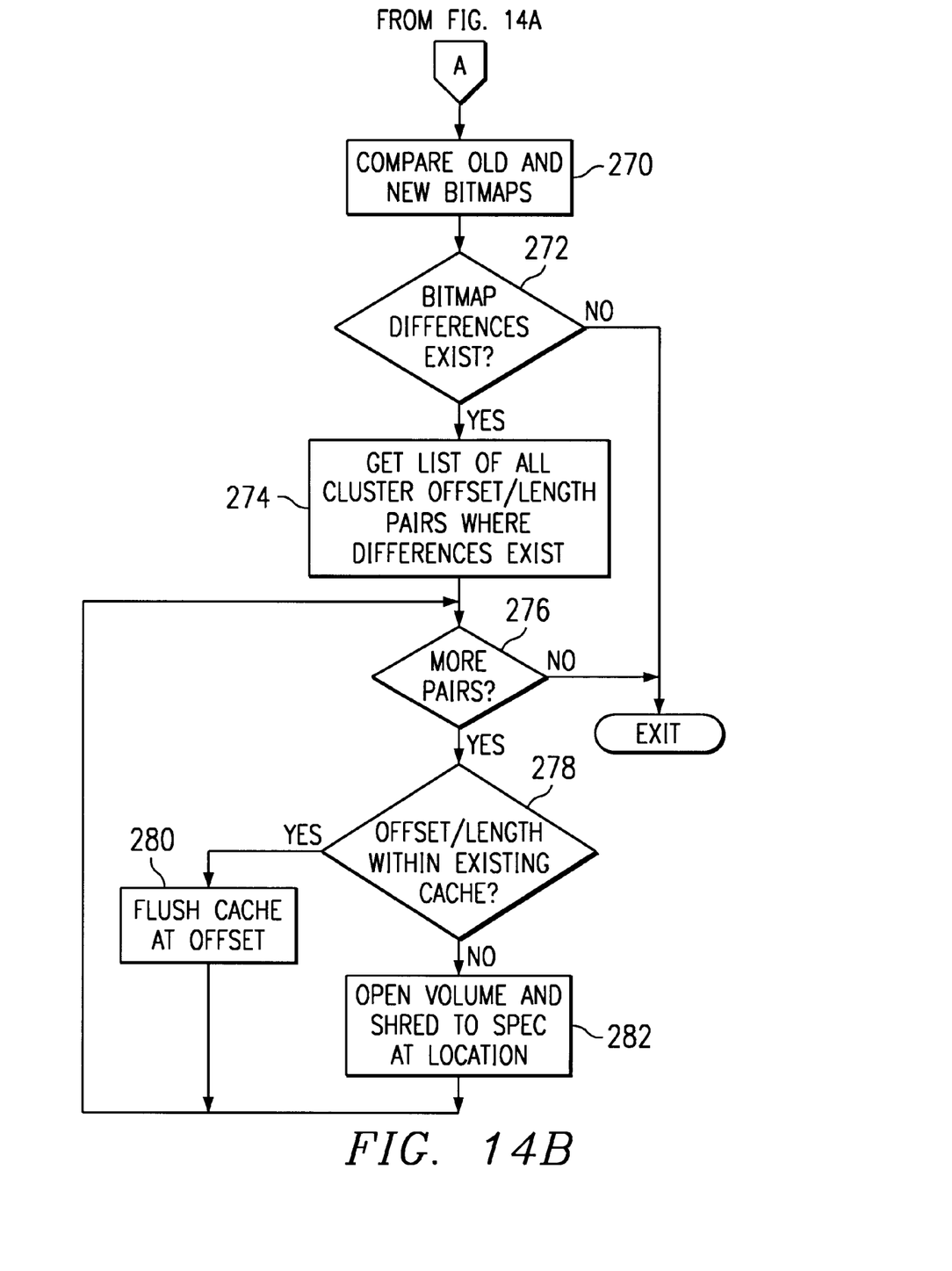
FIG. 14B is a flow chart of additional steps for the process of FIG. 14A.

FIG. 14B is a flow chart of additional steps for the process of FIG. 14A. Step 270 follows step 254 of FIG. 14A. As shown, in step 270, the process compares the old and new bitmaps. The process then determines, in step 272, whether there is a difference between the bitmaps. If not, the process exits. If so, the process gets a list of all cluster offset/length pairs where differences exist in step 274. These pairs are then processed. In step 276, the process determines whether there are pairs to process. If not, the process exits. If so, the process determines, in step 278, whether the offset/length is within the existing cache. It should be noted that, as files are deleted from a directory, the cache containing the index data may shrink if all of the files in a group of clusters at the end of the cache have been deleted. In this case, NTFS does not rewrite the index buffers, and it is sometimes necessary to shred them directly on disk. If the offset/length is within the existing cache, the process flushes the cache at that offset in step 280. It should be noted that in this case, a group of clusters containing index data are no longer needed because the files named within have all been deleted. The clusters still exist in cache because they are somewhere in the middle of the cached data, and there are other clusters beyond them which contain existing file names. In this case, the cache can simply be flushed, and the shredding to specification can occur when the write is filtered by the volume write filter flow discussed above. If, in step 278, the offset/length is not within the existing cache, the process opens the volume, in step 282, and shreds to specification at that location. After step 280 or 282, the process returns to step 276 to determine whether there are more pairs to be processed. If not, the process exits.

Although the present invention has been described in detail, it should be understood that various changes, substitutions and alterations can be made hereto without departing from the spirit and scope of the invention as defined by the appended claims.

What is claimed is:

1. A method for real-time secure data deletion in a system having an NTFS file system comprising monitoring read calls using a read filter and recognizing and storing pointer to NTFS metafile and page files;

monitoring write calls using a write filter and performing real-time secure data deletion of buffers;

monitoring file creation operations and performing real-time secure data deletion of user files when the file is to be overwritten;

monitoring set information operations and performing real-time secure data deletion for truncated, shrunk or deleted user files;

performing real-time secure data deletion of truncated data responsive to recognition of an allocation operation where an old end-of-file is greater than zero and the new allocation is equal to zero;

performing real-time secure data deletion of shrunk data responsive to recognition of an end-of-file operation where an old end-of-file is greater than a new end-of-file; and performing real-time secure data deletion of deleted data responsive to recognition of a delete disposition operation when an old end-of-file is greater than zero.

2. A system for real-time secure data deletion in a system having an NTFS file system, comprising:

a storage device;

a memory;

a processor executing an operating system that provides a file system for managing data on the storage device, and the processor executing a driver within the file system such that the apparatus operates to monitor read calls using a read filter and recognize and store pointers to NTFS metafiles and page files;

to monitor write calls using a write filter and perform real-time secure data deletion of buffers;

to monitor file creation operations and perform real-time secure data deletion of user files when the file is to be overwritten; and to monitor set information operations including performing real-time secure data deletion of truncated, shrunk or deleted user files;

performing real-time secure data deletion of truncated data responsive to recognition of an allocation operation wherein an old end-of-file is greater than zero and the new allocation is equal to zero;

performing real-time secure data deletion of shrunk data responsive to recognition of an end-of-file operation where an old end-of-file is greater than a new end-of-file; and performing real-time secure data deletion of deleted data responsive to recognition of a delete disposition operation where an old end-of-file is greater than zero.

* * * * *